United States Patent
Brehm et al.

(10) Patent No.: US 7,019,048 B2
(45) Date of Patent: Mar. 28, 2006

(54) PLASTIC PART COMPRISING LUSTROUS PIGMENTS AND FILLER PARTICLES

(75) Inventors: Hans-Jürgen Brehm, Lindenfels (DE); Manfred Kieser, Darmstadt (DE); Emil Aust, Mainz (DE)

(73) Assignee: MERCK Gesellschaft mit beschraenkter Haftung, Darmstadt (DE)

( * ) Notice: Subject to any disclaimer, the term of this patent is extended or adjusted under 35 U.S.C. 154(b) by 410 days.

(21) Appl. No.: 10/071,238

(22) Filed: Feb. 11, 2002

(65) Prior Publication Data

US 2002/0120051 A1   Aug. 29, 2002

(30) Foreign Application Priority Data

Feb. 10, 2001   (DE) ............................... 101 06 198

(51) Int. Cl.
*C08K 9/00* (2006.01)
*C08K 7/22* (2006.01)
*C08K 7/28* (2006.01)
*C08K 3/22* (2006.01)
*C09D 5/29* (2006.01)

(52) U.S. Cl. ..................... 523/200; 523/171; 523/216; 523/220; 524/430; 524/492; 524/494; 524/497

(58) Field of Classification Search ............... 523/171, 523/216, 200, 218, 220; 106/415, 489, 409; 524/430, 492, 494, 497
See application file for complete search history.

(56) References Cited

U.S. PATENT DOCUMENTS

| 3,382,201 | A | * | 5/1968 | Gutman et al. ............. 523/171 |
| 4,639,105 | A | * | 1/1987 | Neefe ......................... 351/162 |
| 5,208,081 | A | * | 5/1993 | Gubitz et al. .................. 428/31 |
| 5,882,560 | A | * | 3/1999 | Ittmann et al. .............. 264/122 |
| 6,488,756 | B1 | * | 12/2002 | Schoen et al. .............. 106/415 |
| 6,544,327 | B1 | * | 4/2003 | Griessmann et al. ........ 106/417 |
| 6,545,065 | B1 | * | 4/2003 | Solms et al. ................. 523/171 |
| 6,702,967 | B1 | * | 3/2004 | Overholt et al. .............. 264/77 |
| 2003/0176536 | A1 | * | 9/2003 | Rathschlag et al. ......... 523/171 |

FOREIGN PATENT DOCUMENTS

| EP | 0960911 | | 12/1999 |
| GB | 1587894 A | * | 4/1981 |
| WO | 96/07705 | | 3/1996 |

* cited by examiner

*Primary Examiner*—Callie Shosho
(74) *Attorney, Agent, or Firm*—Millen, White, Zelano & Branigan, P.C.

(57) ABSTRACT

The invention relates to a plastic part having lustrous pigments and filler particles. Moldings of this plastic part exhibit a pronounced glitter effect.

21 Claims, No Drawings

PLASTIC PART COMPRISING LUSTROUS PIGMENTS AND FILLER PARTICLES

The invention relates to a plastic part which may comprise lustrous pigments and filler particles and optionally assistants for plastics processing, such as one or more pigments, stabilisers, plasticisers, fillers and/or reinforcing materials. Plastic parts of this type exhibit a pronounced glitter effect.

The term "lustrous pigments" is defined as pigments in which lustrous effects arise due to directional reflections at metallic or strongly light-refracting pigment particles which have a predominantly two-dimensional shape and alignment. These include pearlescent pigments, which are lustrous pigments which comprise colorless, transparent and highly light-refracting platelets. Due to parallel alignment of pearlescent pigments in plastics or in surface coatings, multiple reflections cause a soft lustrous effect which is known as pearlescence. Pearlescent pigments having a certain layer thickness may satisfy the interference conditions and then exhibit iridescent colors, thus giving rise to the name "interference pigments". The hue here is dependent on the viewing angle. A further feature of these transparent interference pigments is that complementary colors are visible in reflected light and transmitted light. In addition, there are also interference pigments with non-transparent support materials in which only the color in reflected light is visible. Lustrous pigments include nacreous pigments.

The lustrous pigments further include the commercially available metal-effect pigments, such as, for example, aluminium platelets, the goniochromatic lustrous pigments based on silica platelets, aluminium platelets or iron oxide platelets as support material and the liquid-crystal pigments.

Lustrous pigments must have a certain particle size in order to provide a glitter effect to the eye. The eye is capable of recognising an individual pigment platelet in this case as a specific particle. Since the resolving power of the eye is greatly affected by the contrast of the structures to be resolved, a specific particle size at which a glitter effect arises cannot be quoted. In general, lustrous pigments having a particle size of less than 25 µm give rise to a silk to satin gloss. At particle sizes up to about 60 µm, a slightly structured sheen is observed, but it is not yet possible to refer to glittering. Glitter effects are observed at particle sizes of 80 to 100 µm. However, particles of this size cannot always be produced, for example, single crystals of basic lead carbonate or BiOCl or $Al_2O_3$ platelets as substrates for layer/substrate pigments can only be produced with difficulty in sizes of this order. In the case of mica pigments, the production of relatively large particles is less problematic, and pigments of this type are also commercially available.

The known lustrous pigments, including the pearlescent pigments, give rise to lustrous effects, but not glitter effects, in application systems, for example, plastics, owing to their limited particle size.

An object of the invention is to provide plastic parts which comprise lustrous pigments which provide a glitter effect or reinforce the glitter effect in pigments which already exhibit this effect.

Upon further study of the specification and appended claims, further objects and advantages of this invention will become apparent to those skilled in the art.

These and other objects of the invention are achieved by adding filler particles which have a substantially isometric body shape to the plastic, in addition to the lustrous pigment, before processing, where the diameter of these filler particles is in the range of 10 to 200 µm. In addition, assistants in plastics processing, some of which are described in detail in "Taschenbuch der Kunststoff-Additive; Stabilisatoren, Hilfsstoffe, Weichmacher, Füllstoffe, Verstärkungsmittel, Farbmittel" [Handbook of Plastics Additives; Stabilisers, Assistants, Plasticisers, Fillers, Reinforcing Materials and Colorants], 2nd Edition, Carl Hauser Verlag, Munich, Vienna, may also be present.

The invention thus relates to a plastic part comprising lustrous pigments comprising metallic or strongly light-refracting pigment particles or platelets which have a predominantly two-dimensional shape and are aligned substantially parallel with the surface of the plastic part, and filler particles comprising hollow, solid or compact particles which have a substantially isometric body shape and have a diameter of 10 to 200 µm. Two-dimensional refers to particles, which are actually three-dimensional, but the thickness is small.

The filler particles preferably are small transparent beads, which are hollow, solid or compact. Deviations from the ideal spherical shape are possible, but the filler particles should predominantly have virtually isometric shapes. This means that the dimensions of the particles are approximately the same in all three spatial directions. The surface of the filler particles is preferably smooth. In the case of rough surfaces, for example, in ground filler particles, although a coarse glitter effect is observed, the colors have, for example, somewhat reduced brilliance. Preferred fillers are glass beads or hollow glass beads from the Minnesota Mining and Manufacturing Company. Materials, other than glass may be used, such as various duroplastics which do not melt or dilute during the production of the plastic part, or $SiO_2$ spheres. The refractive index of the filler particles material should be approximately in the order of the refractive index of the matrix material into which the filler particles and lustrous pigments are incorporated in order to avoid excessively impairing the transparency and thus the lustrous of the pigmented matrix material. The shape and surface area of the filler particles are of importance. Of lesser importance is the material of which the filler particles are made. Additionally, the filler particles should not melt or dilute in the matrix material during the production of the plastic part.

An important parameter when selecting the filler particles is the diameter of the filler particles. This is between 10 and 200 µm, with preferred particle diameters being between 15 and 150 µm, in particular between 20 and 120 µm. The amount of filler particles is from 0.2 to 10 parts by weight, preferably from 0.5 to 5 parts by weight and in particular from 0.5 to 3 parts by weight, based on the total weight of the plastic part.

Lustrous pigments which can be employed are platelet-shaped pigments, such as metal-effect pigments, goniochromatic lustrous pigments, interference pigments, pearlescent pigments and liquid-crystal pigments.

Metal-effect pigments comprise platelets of the metals aluminium, copper, zinc, tin and alloys thereof, in particular aluminium and gold-bronze alloys. The surface of the metal platelets can be passivated or provided with a protective layer, for example, of metal oxides. Metal-effect pigments are marketed by the Eckart company under the trade name Standard®.

Goniochromatic lustrous pigments comprise multicoated platelet-shaped metallic substrates, transparent non-metallic substrates or multicoated metal-oxide platelets. Aluminium platelets are employed as metallic substrate, mica is employed as transparent non-metallic substrate and iron oxide is employed as metal-oxide platelets. These lustrous pigments are described in greater detail in EP 741 170, EP 708 154 and EP 753 545. They are available from BASF under the trade names Paliochrom® and Variochrom®.

Multilayered interference pigments having a light-opaque aluminium layer as the central layer are produced by the Flex company under the trade names Chromaflair® and OVP® (optically variable pigments). These pigments, which are primarily employed in security printing, basically have a five-layered structure. On a central light-opaque aluminium layer, layers of magnesium fluoride as interlayers and subsequently semi-transparent chromium layers as outer layers are deposited on both sides. The pigments are described in U.S. Pat. No. 4,434,010.

Interference pigments having transparent support materials are known as pearlescent pigments. The platelet-shaped transparent support materials may be mica, other phyllosilicates, such as talc or kaolin, glass flakes, $SiO_2$ flakes, $TiO_2$ flakes or $Al_2O_3$ flakes. These support materials are coated with one or more metal-oxide layers. The metal oxides used here are both colorless high-refractive-index metal oxides, such as, for example, titanium dioxide or zirconium oxide, colorless low-refractive-index metal oxides, such as, for example, silicon dioxide or aluminium oxide, and colored metal oxides, such as, for example, chromium oxide, cobalt oxide and in particular iron oxides. These platelet-shaped pearlescent pigments are known and for the most part commercially available. Pearlescent pigments are described, for example, in German Patents 31 37 808, 31 37 809, 31 51 343, 31 51 354, 31 51 355, 32 11 602 and 32 35 017. These pigments are available from Merck KGaA under the trade names Iriodin®, Colorstream® and Xirallic®.

Liquid-crystal pigments are interference pigments based on liquid-crystalline polymers. The individual pigment particles are fragments of a thin crosslinked film of liquid-crystalline polymers. The color effects which can be achieved therewith are based on the regular structure and homogeneous arrangement of the molecules in the form of a liquid crystal and on interference, attributable thereto, of a certain spectral light fraction which is reflected by the pigment. The other light fractions pass through the pigment. Liquid-crystalline interference pigments are described in U.S. Pat. Nos. 5,807,497 and 5,824,733. They are available from Wacker-Chemie GmbH under the trade name HELICONE® HC.

The diameter of the particles of the non-glittering lustrous pigments employed in accordance with the invention is in the range of 2 to 80 μm. The pigments can be used individually or in the form of a pigment mixture. Pigment and filler particles can likewise be added as individual components or in the form of a mixture to the matrix material, for example plastic granules. The sequence of addition of the two components is unimportant.

Lustrous pigments are generally employed in plastics in concentrations of 0.5–2% by weight. In films or thin layers, significantly higher concentrations are necessary. The crucial factor for the pigment concentration needed is the desired effect.

The addition of filler particles to the lustrous pigments causes the latter to be deflected out of their more or less ideal alignment parallel to the surface. A certain tilt of the pigments toward one another occurs, i.e., they are no longer aligned substantially parallel with the surface of the plastic part, giving rise to the visual impression of individual particles having larger particle diameters than the actual particle diameters. This visual impression results in an apparent coarsening of the surface of the pigment particles tilted toward one another, giving rise to a glitter effect which is observable over a much greater viewing-angle range than a glitter effect which can be achieved with lustrous pigments having larger particle sizes.

In addition, the effects of the pigments which are larger than 80 μm are also influenced, i.e., reinforced. In the case of lustrous pigments which already exhibit a glitter effect owing to their particle size, the glitter effect is reinforced and becomes visible over a greater angle range.

The use of the filler particles together with strongly changing interference pigments, available, for example, under the trade name "Colorstream®", produced by Merck KGaA, reduces the angle dependence of the color change (flop). The transition from one color to another color becomes softer, i.e. the angle range within which the color changes becomes greater.

The use of filler particles in the plastic part may gradually reduce the visibility of flow lines and weld lines.

For a plastic part according to the invention, use can be made of known, transparent plastics, in particular thermoplastics. Suitable plastics are, for example, polyethylene (PE), polypropylene (PP), polystyrene (PS), polyphenylene oxide, polyacetal, polybutylene terephthalate, polymethyl methacrylate, polyvinyl acetate, acrylonitrile-butadiene-styrene (ABS), acrylonitrile-styrene-acrylate (ASA), polycarbonate, polyether sulfone, polyether ketones and copolymers and/or mixtures thereof. In addition, it is also possible to use casting resins, for example unsaturated polyester and methyl methacrylate casting resins.

In the case of so-called direct coloring, the plastic granules are uniformly wetted at the surface with coupling agents, for example, diisooctyl phthalate, and lustrous pigments and filler particles are then added and distributed uniformly on the surface of the plastic granules by mixing. This mixture is then processed directly in an injection-molding machine. The moldings obtained exhibit a very homogeneous distribution of the lustrous pigments.

Direct coloring is a process which is preferably used in the laboratory. In production, masterbatches are employed. The term masterbatch is applied to a pigment preparation in which the pigment is in a significantly higher concentration than in the end product and is in fully dispersed form in a matrix which is compatible with the starting material. The incorporation of lustrous pigments into plastics is described in detail in "Perlglanzpigmente" [Pearlescent Pigments], edited by Dr. Ulrich Zorll, Curt R. Vincentz Verlag, Hanover 1996.

Lustrous pigments and filler particles are incorporated into unsaturated plastics by stirring-in before the casting process.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosures of all applications, patents and publications, cited above or below, and of corresponding German application No. 10106198.6, filed Feb. 10, 2001, is hereby incorporated by reference.

EXAMPLES

Example 1

978 g of PP granules having the trade name Stamylan® PPH 10 from DSM are wetted on the surface with 2 g of diisooctyl phthalate in a tumble mixer and subsequently mixed well. 10 g of $TiO_2$-coated mica pigments having a particle size of 5 to 25 μm from E. Merck, Darmstadt, Federal Republic of Germany (Iriodin 123 satin) and 10 g of filler particles are subsequently added and distributed uniformly on the surface of the plastic granules by mixing. The filler particles are hollow glass beads having diameters of essentially 20 to 80 μm which are available under the trade name Scotchlite® K37 from the 3M Company, USA. The plastic granules pigmented in this way are converted into moldings by injection molding by means of an injection-molding machine. Compared with Comparative Example 1, the finished moldings exhibit significantly more coarsely structured pearlescence which does not correspond to the usual appearance in accordance with the particle size of the pearlescent pigments employed. This more coarsely structured pearlescence represents a glitter effect. The angle dependence of the lustrous effect is less than in the comparative example. The proportion by weight of the pearlescent pigment and filler particles in the molding is in each case 1%.

Example 2

The same components as in Example 1 are used, but the Scotchlite® K37 hollow glass beads are replaced by Scotchlite® K1 hollow glass beads from the 3M Company, USA. The diameter of the filler particles is essentially in the range of 30 to 110 μm. The glitter effect observed visually corresponds to that in Example 1.

Example 3

As in Example 1, 978 g of PP granules (Stamylan® PPH10 granules) are wetted on the surface with 2 g of diisooctyl phthalate in a tumble mixer and subsequently mixed well. 10 g of a silver-colored pearlescent pigment comprising $Al_2O_3$ as substrate and a coating of $TiO_2$ and 10 g of filler particles (Scotchlite® K37 hollow glass beads from the 3M Company, USA) are then added and distributed uniformly on the surface of the plastic granules by mixing. Pigments with $Al_2O_3$ as substrate are available under the trade name Xirallic® from Merck KGaA. The plastic granules pigmented in this way are converted into moldings by injection molding by means of an injection-molding machine. The individual molding exhibits a significantly coarser, structured pearlescence than is to be expected of the pigment used owing to its particle size. This pearlescence evokes the visual impression of a glitter effect.

Example 4

983 g of PP granules (Stamylan® PPH10) are wetted on the surface with 2 g of diisooctyl phthalate and subsequently mixed well. 5 g a changing pearlescent pigment comprising $SiO_2$ as substrate and $Fe_2O_3$ as coating and 5 g of Scotchlite® K37 hollow glass beads from the 3M Company, USA, are then added and distributed uniformly on the surface of the plastic granules by mixing. The pearlescent pigments are available under the trade name Colorstream® from Merck KGaA, Darmstadt, Federal Republic of Germany. The proportion by weight of the pearlescent pigment and filler particles in the plastic part is in each case 0.5%. The pigmented plastic granules are converted into moldings by injection molding by means of an injection-molding machine. The injection moldings obtained exhibit a significantly coarser, structured pearlescence than would have been expected of this pigment on the basis of its particle size. The color transition from blue-red to greenish is softer and the color flop occurs in a broader viewing-angle range than in the case of use of the pigments without filler particles.

Comparative Example 988 g of PP granules (available from DSM, the Netherlands, under the trade name Stamylan® PPH10) are wetted on the surface with 2 g of diisooctyl phthalate in a tumble mixer and subsequently mixed well. 10 g of lustrous pigments based on $TiO_2$-coated mica pigments having a particle size of 5 to 25 μm are then added (commercial product Iriodin® 123 Glanzsatin from Merck KGaA, Darmstadt, FRG) and distributed uniformly on the surface of the granules by mixing. These pigmented granules are converted into moldings by means of an injection-molding machine. The lustrous pigment has a proportion by weight of 1% in the finished molding.

The finished moldings exhibit good, not very structured pearlescence in accordance with their particle size. The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A plastic part comprising (a) platelet-shaped lustrous pigments comprising strongly light-refracting pigment particles that are goniochromatic lustrous pigments, interference pigments, pearlescent pigments or liquid crystal pigments and (b) hollow or solid filler particles which have a substantially isometric body shape and a diameter of 15 to 150 μm in an amount of 0.2 to 10 by weight, based on the total weight of the plastic part.

2. A plastic part according to claim 1, wherein the filler particles have a diameter of 20 to 120 μm.

3. A plastic part according to claim 1, wherein the lustrous pigments are platelets of aluminum, copper, zinc, tin and alloys thereof, wherein the platelets are coated with one or more metal oxides, multicoated aluminum platelets, multicoated iron oxide platelets, or pigments of support materials of mica, phyllosilicates, glass flakes, $SiO_2$ flakes, $TiO_2$ flakes or $Al_2O_3$ flakes wherein the pigments coated with one or more metal oxide layers, or a mixture thereof.

4. A plastic part according to claim 1, comprising by weight 0.5 to 5% filler particles based on the total weight of the plastic part.

5. A plastic part according to claim 1, wherein the filler particles have the shape of glass or hollow glass beads having a diameter of 20 to 110 μm.

6. A plastic part according to claim 1, wherein the filler particles have the shape of glass or hollow glass beads having a diameter of 20 to 80 μm.

7. A plastic part according to claim 1, further comprising one or more assistants for plastics processing.

8. A plastic part according to claim 1, comprising by weight 0.5 to 3% filler particles based on the total weight of the plastic part.

9. A plastic part according to claim 1, wherein the filler particles have a smooth surface.

10. A plastic part according to claim 1, wherein the particles of the lustrous pigments have a diameter of 2 to 80 µm.

11. A plastic part according to claim 1, comprising one or more transparent plastics.

12. A plastic part according to claim 1, comprising one or more thermoplastics.

13. A plastic part according to claim 1, wherein the alignment of the lustrous pigment particles or platelets is other than substantially parallel with the surface of the plastic part in order to give rise to a glitter effect.

14. A plastic part according to claim 1, which exhibits a pronounced glitter effect derived from the effect of filler particles on the lustrous pigment particles or platelets.

15. A plastic part according to claim 1, wherein the filler particles are in the form of hollow, or solid beads.

16. A plastic part prepared by a process comprising incorporating into a plastic (a) platelet-shaped lustrous pigments comprising strongly light-refracting pigment particles that are goniochromatic lustrous pigments, interference pigments, pearlescent pigments or liquid crystal pigments and (b) hollow or solid filler particles which have a substantially isometric body shape and a diameter of 15 to 150 µm in an amount of 0.2 to 10 parts by weight, based on the total weight of the plastic part.

17. A plastic part prepared by a process according to claim 16, the process further comprising forming the plastic part by injection molding.

18. A plastic part according to claim 16, wherein the lustrous pigments are platelets of aluminum, copper, zinc, tin and alloys thereof, wherein the platelets are coated with one or more metal oxides, multicoated aluminum platelets, multicoated iron oxide platelets, or pigments of support materials of mica, phyllosilicates, glass flakes, $SiO_2$ flakes, $TiO_2$ flakes or $Al_{2O3}$ flakes wherein the pigments are coated with one or more metal oxide layers, or a mixture thereof.

19. A process for preparing a plastic part comprising incorporating into a plastic (a) platelet-shaped lustrous pigments comprising strongly light-refracting pigment particles that are goniochromatic lustrous pigments, interference Pigments, pearlescent pigments or liquid crystal pigments and (b) hollow or solid filler particles which have a substantially isometric body shape and a diameter of 15 to 150 µm in an amount of 0.2 to 10 parts by weight, based on the total weight of the plastic part.

20. A process for preparing a plastic part according to claim 19, further comprising forming the plastic part by injection molding.

21. A process according to claim 19, wherein the lustrous pigments are platelets of aluminum, copper, zinc, tin and alloys thereof, wherein the platelets are coated with one or more metal oxides, multicoated aluminum platelets, multicoated iron oxide platelets, or pigments of support materials of mica, phyllosilicates, glass flakes, $SiO_2$ flakes, $TiO_2$ flakes or $Al_{2O3}$ flakes wherein the pigments are coated with one or more metal oxide layers, or a mixture thereof.

* * * * *

UNITED STATES PATENT AND TRADEMARK OFFICE
CERTIFICATE OF CORRECTION

PATENT NO. : 7,019,048 B2 Page 1 of 1
APPLICATION NO. : 10/071238
DATED : March 28, 2006
INVENTOR(S) : Hans-Jürgen Brehm et al.

It is certified that error appears in the above-identified patent and that said Letters Patent is hereby corrected as shown below:

Column 6, line 45, reads "10 by weight," should read -- 10% by weight, --
Column 6, line 55, reads "pigments coated" should read -- pigments are coated --
Column 7, line 21, reads "hollow, or solid" should read -- hollow or solid --
Column 7, line 29, reads "10 parts by weight" should read -- 10% by weight, --
Column 8, line 8, reads "$Al_{2O3}$" should read -- $Al_2O_3$ --
Column 8, line 13, reads "Pig-" should read -- pig- --
Column 8, line 18, reads "10 parts by weight" should read -- 10% by weight, --
Column 8, line 30, reads "$Al_{2O3}$" should read -- $Al_2O_3$ --

Signed and Sealed this

Twenty-seventh Day of February, 2007

JON W. DUDAS
*Director of the United States Patent and Trademark Office*